US010670150B2

(12) United States Patent
Ziegenbein et al.

(10) Patent No.: US 10,670,150 B2
(45) Date of Patent: Jun. 2, 2020

(54) MECHANICAL SEAL ARRANGEMENT WITH A BELLOWS ELEMENT

(71) Applicant: EagleBurgmann Germany GmbH & Co. KG, Wofratshausen (DE)

(72) Inventors: Dieter Ziegenbein, Geretsried (DE); Wolfgang Ries, Bad Kohlgrub (DE); Rudolf Schicktanz, Geretsreid (DE); Jorg Thelke, Wolfratshausen (DE); Robert Woppowa, Wolfratshausen (DE); Andreas Eiletz, Wolfratshausen (DE); Peter Haselbacher, Munich (DE); Elisabeth Brustmann, Wolfratshause (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 15/743,746

(22) PCT Filed: May 12, 2016

(86) PCT No.: PCT/EP2016/060629
§ 371 (c)(1),
(2) Date: Jan. 11, 2018

(87) PCT Pub. No.: WO2017/012731
PCT Pub. Date: Jan. 26, 2017

(65) Prior Publication Data
US 2018/0195620 A1    Jul. 12, 2018

(30) Foreign Application Priority Data
Jul. 17, 2015 (DE) ......................... 10 2015 213 472

(51) Int. Cl.
*F16J 15/36* (2006.01)
*F16J 15/34* (2006.01)
*F16J 15/32* (2016.01)

(52) U.S. Cl.
CPC ............... *F16J 15/36* (2013.01); *F16J 15/32* (2013.01); *F16J 15/3464* (2013.01); *F16J 15/3472* (2013.01)

(58) Field of Classification Search
CPC .......... F16J 15/32; F16J 15/34; F16J 15/3404; F16J 15/3436; F16J 15/344; F16J 15/3452; F16J 15/36
See application file for complete search history.

(56) References Cited

U.S. PATENT DOCUMENTS 2,203,525 A    6/1940   Dupree, Jr.
2,505,868 A    5/1950   Murphy
(Continued)

OTHER PUBLICATIONS

Office Action issued in corresponding Japanese Patent Application No. JP 2018-502174, dated Jan. 29, 2019.
(Continued)

*Primary Examiner* — Gilbert Y Lee
(74) *Attorney, Agent, or Firm* — Locke Lord LLP; Scott D. Wofsy (57) ABSTRACT

The invention relates to a mechanical seal arrangement, comprising a rotating slide ring (11) and a stationary slide ring (12), which define a sealing gap (13) in between them, and a bellows unit (2) with a bellows element (3) and an intermediate disc (4), wherein the bellows element (3) has a first connector area (31), a second connector area (32), and a bellows intermediate area (33), wherein the bellows element (3) is made of an elastomer material and provides a connection between the rotating slide ring (11) and a rotating structural component (10), wherein the intermediate disc (4) is arranged between the bellows element (3) and the rotating slide ring (11), and wherein the intermediate disc (4) has at least one slit (47) that has a slit width (B) that is smaller than a slit length (S), and wherein the slit (47) is closed at one side, so that a connection area (49) remains at the slit (47) at the intermediate disc (4).

18 Claims, 5 Drawing Sheets

(56) References Cited

U.S. PATENT DOCUMENTS

| | | | | |
|---|---|---|---|---|
| 4,163,563 A | * | 8/1979 | Mullaney | F16J 15/366 |
| | | | | 277/379 |
| 4,365,816 A | * | 12/1982 | Johnson | F16J 15/363 |
| | | | | 277/379 |
| 4,558,872 A | | 12/1985 | Vossieck et al. | |
| 5,375,852 A | | 12/1994 | Charhut | |
| 5,924,697 A | * | 7/1999 | Parker | F16J 15/3484 |
| | | | | 277/361 |
| 6,220,601 B1 | | 4/2001 | Keller et al. | |
| 2003/0006560 A1 | * | 1/2003 | Dahlheimer | F16J 15/3468 |
| | | | | 277/389 |

OTHER PUBLICATIONS

International Search Report issued in PCT/EP2016/060629, dated Jul. 18, 2016.

* cited by examiner

MECHANICAL SEAL ARRANGEMENT WITH A BELLOWS ELEMENT

CROSS REFERENCE TO RELATED APPLICATIONS

This Application is a 371 U.S. National Phase Application of International PCT Patent Application No. PCT/EP2016/060629 filed May 12, 2016, which application claims priority to German Patent Application No. 10 2015 213 472.5, filed on Jul. 17, 2015. The entire contents of these applications are incorporated herein by reference in their entirety.

The present invention relates to a mechanical seal arrangement with a bellows element that has an improved axial readjusting behavior during operation.

Mechanical seal arrangements with bellows elements are known from the state of the art in different embodiments. In principle, the bellows element can be an elastomer bellows or a metal bellows that in particular facilitates an axial readjusting of the mechanical seal, e.g. in the event of shaft deflections. It has been found that particularly when an elastomer bellows is used, this may result in a deteriorated readjusting behavior of the mechanical seal arrangement. For one thing, this is due to the fact that a support shoulder of the bellows element can get stuck on a shaft surface or the like as a result of the softness of the elastomer material, and thus is not able to follow the axial readjusting quickly enough. This is even more likely to occur if for example there are contaminations present on the shaft surface, which may be caused during operation by depositions on the shaft. This may lead to a complete blockage of the axial movability of the bellows element after a longer operation of the mechanical seal arrangement. Further, it has been found that, even with no contaminations being present, the support shoulder of the elastomer bellows can cause an obstruction of the readjusting behavior in connection with vibrations that occur during operation as a result of the increased friction between the elastomer material and the shaft. The above-described problems can result in an increased leakage at the sealing gap and even a failure of the mechanical seal arrangement during operation.

Therefore, it is the objective of the present invention to provide a mechanical seal arrangement with an elastomer bellows element that has an improved readjusting behavior during its entire service life, while at the same time having a simple structure and a simple and cost-effective manufacturability, which in particular serves to avoid the danger of any catching or jamming of the bellows element occurring during the readjusting procedure.

This objective is achieved by means of a mechanical seal arrangement with the features of claim 1. The subclaims show preferred further developments of the invention.

The mechanical seal arrangement according to the invention with the features of claim 1 has the advantage that an axial movability of a rotating elastomer bellows element is significantly improved. Thus, a considerably improved axial readjusting behavior of the mechanical seal arrangement can be achieved, leading to considerably reduced leakage rates during operation, in particular during start-up processes of the mechanical seal arrangement. According to the invention, this is achieved by the mechanical seal arrangement having a bellows unit with a bellows element as well as a separate ring-shaped intermediate disc. The bellows element comprises a first connector area for a connection to a rotating structural component, such as for example a rotating shaft, a second connector area for a connection to a rotating slide ring and a flexible bellows intermediate area arranged between the first and the second connector area. Here, the bellows element is made completely of an elastomer material. The intermediate disc is made of a more rigid material than the elastomer material, in particular of a synthetic material. Here, the ring-shaped intermediate disc is arranged in such a manner at the bellows element that a first side of the intermediate disc abuts the rotating slide ring, in particular at a backside of the rotating slide ring, and a second side of the intermediate disc abuts the bellows element, in particular at a ledge of the bellows element at the second connector area. At that, the intermediate disc has at least one slit which has a slit width that is smaller than a slit length. At that, the slit is closed on one side in such a manner that a connection area remains at the intermediate disc in the area of the slit. In other words, the slit is not provided continuously in the intermediate disc, but rather this slit is formed in the intermediate disc only partially, so that a ring-shaped closed area of the intermediate disc still remains at the connection area. Thus, thanks to the partially provided slit in the intermediate disc, the intermediate disc can thus easily expand during operation if heated up, and can contract again as it cools off. Here, the slit serves to prevent the intermediate disc from shrinking onto the rotating structural component, e.g. a shaft, as it cools off. The connection area at the slit end prevents any widening of the intermediate disc.

It is particularly preferable if the slit is arranged in the intermediate disc in such a manner that the slit is provided beginning at an inner circumference of the intermediate disc. In this manner, the temperature-caused expansion processes and shrinking processes of the intermediate disc can be optimally compensated by the intermediate disc. During cooling, a slit width in the area of the orifice of the slit at the inner circumference of the intermediate disc is reduced. here, the slit prevents any shrinking of the intermediate disc onto the rotating structural component.

It is particularly preferable if the intermediate disc has exactly one slit. In this manner, a sufficient temperature-related deformability of the intermediate disc may be ensured.

Preferably, the slit width corresponds to a radial length of the connection area.

It is particularly preferable if the slit has a slit length that is larger than half the ring width of the intermediate disc in the radial direction. It is particularly preferable if the slit length is greater or equal to ¾ the ring width of the intermediate disc in the radial direction.

What is further preferred is that a ratio of the slit width to a slit length is in a range of 0.05 to 0.35. It is particularly preferable if the ratio of the slit width to the slit length is approximately 0.17.

What is further preferred is that a ratio of the slit length to the ring width of the intermediate disc is in a range of 0.7 to 0.95. It is particularly preferable if the ratio of the slit length to the ring width of the intermediate disc is approximately 0.85.

It is particularly preferable if the intermediate disc has a plurality of recesses at an inner circumference. What thus results is an intermediate disc with a profiled inner circumference. In this manner, in particular also a flushing of the area inside the bellows element can be achieved.

It is further preferred that an inner diameter at the inner circumferential area of the intermediate disc is chosen in such a manner that a distance to the rotating structural component is present. Thus, an annular gap is provided between the intermediate disc and the rotating structural component, so that fluid can always reach the inner area of the bellows element. Further, it can be ensured in this manner that a contraction of the intermediate disc, in particular at the inner circumferential area, is ensured in all operational states.

Here, the recesses are preferably provided to be regular at the inner circumference of the intermediate disc. Further, the recesses preferably have a bow-shaped geometrical shape or a substantially rectangular geometrical shape.

It is further preferred for the intermediate disc to have an uneven number of recesses at the inner circumference.

It is particularly preferable if the slit extends beginning at one of the recesses.

It is particularly preferable if the slit is provided in the radial direction.

According to a further preferred embodiment of the present invention, the bellows unit further comprises a first Z profile angle and a second Z profile angle. Here, the first Z profile angle is arranged at an outer side of the first connector area, and the second Z profile angle is arranged at an outer side of the second connector area. At that, the two Z profile angles are formed in a ring-shaped manner and have a Z-shaped cross section with a radially outward facing area, an axial area, and a radially inward facing area. The Z profile angles are preferably made of a metallic material and additionally stiffen the first and second connector areas of the elastomer bellows element.

It is particularly preferable if the second Z profile angle, which is arranged at the second connector area, is arranged in such a manner that the second Z profile angle ends at the same height as the second connector area in the axial direction of the mechanical seal arrangement. In this manner, a complete stiffening of the second connector area is achieved, so that in particular a clamping length, with which the second connector area of the bellows element clamps the rotating slide ring, can be reduced. This results in a reduction of the axial length of the bellows unit, and thus in a desired reduction of the entire axial length of the mechanical seal arrangement.

According to a further preferred embodiment of the invention, the bellows unit further comprises a spring element which pre-tensions the bellows element in the axial direction. The spring element is preferably a barrel spring. Here, it is particularly preferable if the spring element is supported with a first end area at the first Z profile angle, and with a second end area at the second Z profile angle.

For securely affixing the intermediate disc at the bellows element, the bellows element preferably has a groove inside of which the intermediate disc is arranged. In this manner, a simple mounting and secure affixing of the intermediate disc at the bellows element is achieved.

Preferably, a torque introduction of a torque of the rotating structural component into the rotating slide ring is realized exclusively via the bellows unit. In this manner, a particularly compact design can be provided.

It is further preferred that a radially inward facing wall area of the first Z profile angle overlaps with an end of the first connector area that is facing towards the bellows intermediate area. Preferably, also a radially inward facing wall area of the second Z profile angle overlaps with an end of the second connector area that is facing towards the bellows intermediate area. In this manner, an improved rigidity of the elastomer bellows element and in particular its two connector areas can be achieved.

Preferably, the bellows element comprises a non-stick coating.

In the following, preferred exemplary embodiments of the invention are described in detail by referring to the accompanying drawing, with identical parts or parts having identical functions being indicated by the same reference signs. In the drawing.

In the following, a mechanical seal arrangement 1 according to a first exemplary embodiment of the invention is described in detail by referring to FIGS. 1 to 5.

Figure 1:
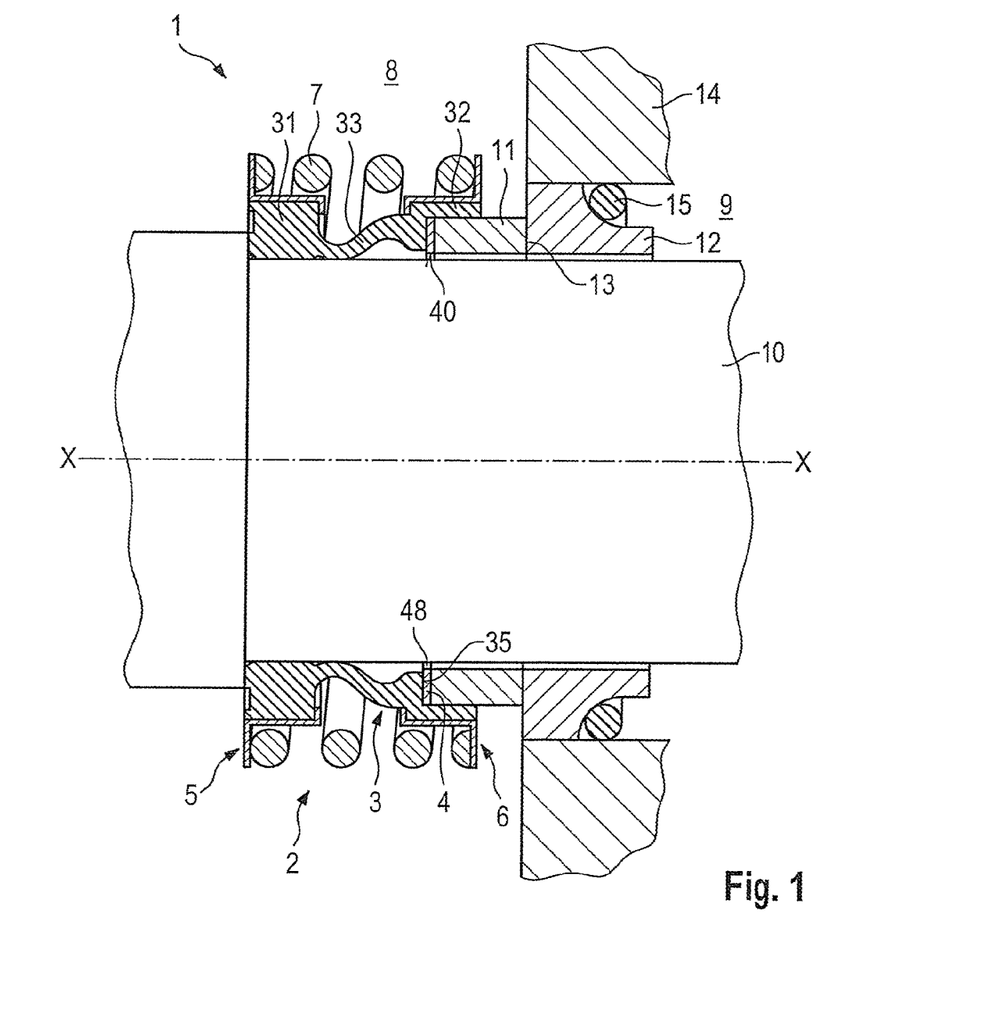
FIG. 1 shows a schematic longitudinal section view of a mechanical seal arrangement according to a first exemplary embodiment of the invention.

As can be seen in FIG. 1, the mechanical seal arrangement 1 comprises a rotating slide ring 11 and a stationary slide ring 12 which define a sealing gap 13 in between them in the known manner. The mechanical seal arrangement 1 serves for sealing a first space 8 against a second space 9.

The rotating slide ring 11 is connected to a rotating structural component 10, which in this exemplary embodiment is a shaft, and rotates together with the same. The stationary slide ring 12 is connected to a stationary housing 14. The reference sign 15 indicates a secondary sealing element for sealing the stationary slide ring 12 against the housing 14.

The mechanical seal arrangement 1 further comprises a bellows unit 2, which establishes the connection between the rotating slide ring 11 and the rotating structural component 10. The bellows unit 2 comprises a bellows element 3 and a single-part intermediate disc 4. The bellows element 3 is made of an elastomer material and comprises a first connector area 31, a second connector area 32, and a bellows intermediate area 33 that is located between the two connector areas 31, 32. The bellows intermediate area 33 is flexible and facilitates an elongation and shortening of the bellows element 3 in the axial direction X-X.

As can be seen from FIG. 1, the bellows element 3 is a single-part structural component and serves for providing a sealing at the rotating slide ring 11. Further, the bellows unit 2 takes over a torque transmission from the rotating structural component 10 to the rotating slide ring 11.

The bellows unit 2 further comprises a first Z profile angle 5 and a second Z profile angle 6. The first Z profile angle 5 is arranged at the first connector area 31 at its outer diameter. The second Z profile angle 6 is arranged at the second connector area 32 at its outer diameter. In section, the two Z profile angles 5, 6 have a Z profile.

The first Z profile angle 5 comprises a first radially outward facing area 51, a first radially inward facing area 52, and a first axial area 53. The second Z profile angle 6 comprises a second radially outward facing area 61, a second radially inward facing area 62, and a second axial area 63 (cf. FIG. 2). Here, the first radially inward facing area 52 of the first Z profile angle overlaps with an end of the first connector area 31 that is facing towards the bellows intermediate area 33. The second radially inward facing area 62 of the second Z profile angle 6 overlaps with an end of the second connector area 32 (cf. FIG. 1) that is facing towards the bellows intermediate area 33. Here, the two axial areas 53, 63 of the two Z profile angles 5, 6 rest on the outer diameters of the first and second connector areas 31, 32. In this manner, the elastomer connector areas 31, 32 are crimped.

Further, an end of the second connector area 32 and the second radially outward facing area 61 of the second Z profile angle 6 are positioned at the same height in the axial direction X-X, thus resulting in an even end surface.

The bellows element 3 further comprises a ledge 34 at its inner circumference. As can be seen from FIG. 2, the intermediate disc 4 abuts a face-side contact surface 35. An inner circumferential area 40 of the intermediate disc has a distance to the outer circumference of the rotating structural component 10. The result is a ring-shaped gap 48 between the inner circumferential area 40 of the intermediate disc 4 and the rotating structural component 10. In this manner, a continuous connection of the rotating slide ring 11 to the area between the bellows element 3 and the rotating structural component 10 is ensured.

Figure 3:
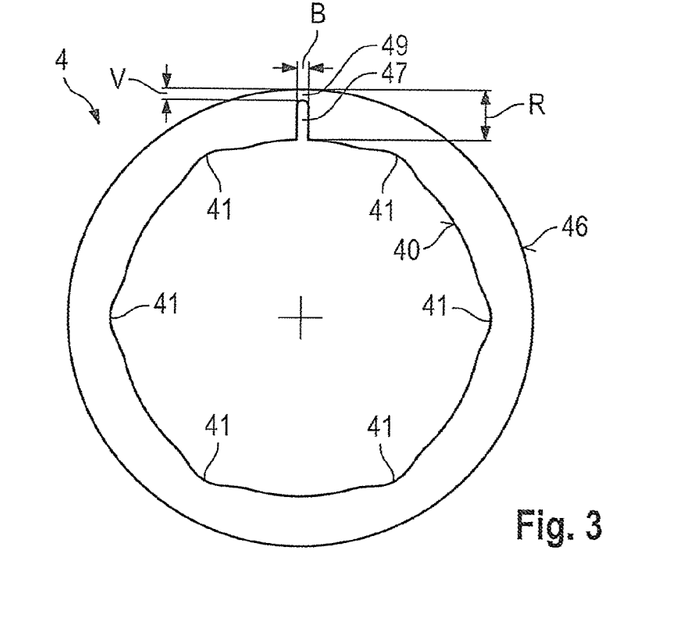
FIG. 3 shows a schematic top view of an intermediate disc according to the first exemplary embodiment of the invention.
Figures 4, 5:
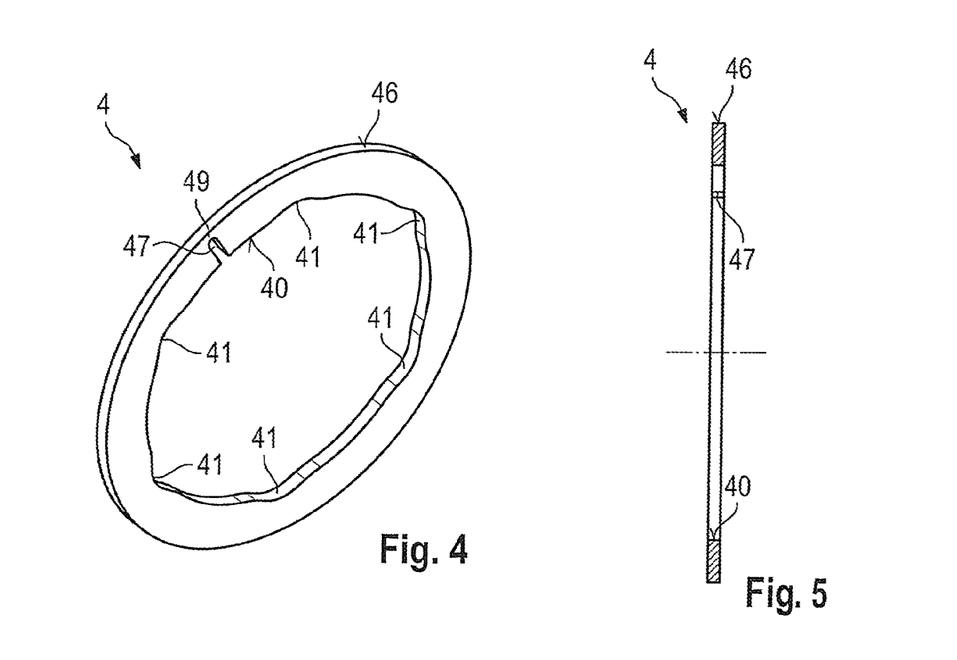
FIG. 4 shows a perspective view of the intermediate disc of FIG. 3.
FIG. 5 shows a sectional view of the intermediate disc of FIG. 3.
Figure 6:
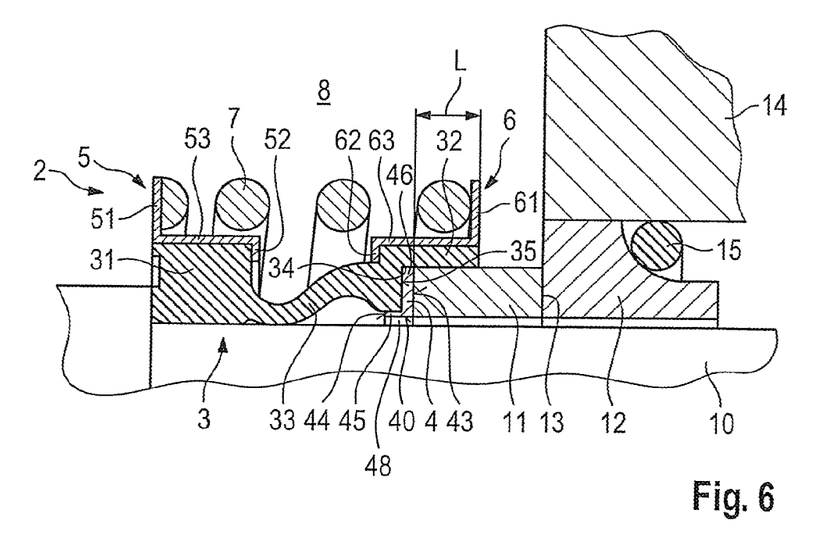
FIG. 6 shows a schematic view of a mechanical seal arrangement according to a second exemplary embodiment of the invention.
Figure 7:
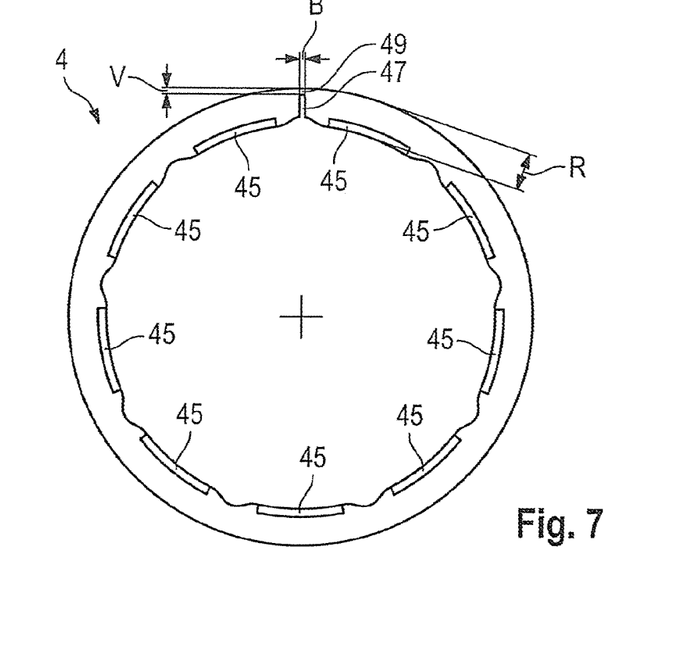
FIG. 7 shows a schematic top view of the intermediate disc of FIG. 6.
Figure 8:
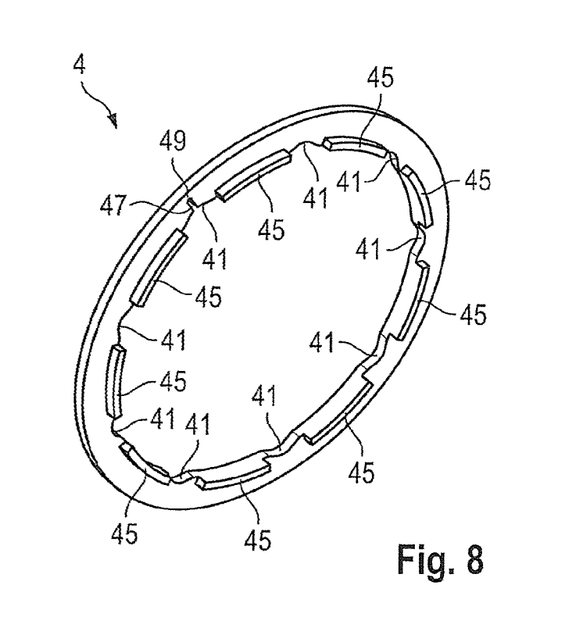
FIG. 8 shows a perspective view of the intermediate disc of FIG. 7.

FIGS. 3 to 5 show a detailed illustration of the intermediate disc 4. As can be seen from FIG. 3, a plurality of recesses 41 is provided at the inner circumferential area of the intermediate disc 4, with the recesses 41 enlarging the passage cross section at the bellows element. In this manner, the axial readjusting behavior of the bellows element is maintained at all times.

Further, the intermediate disc 4 has a slit 47. The slit 47 extends radially outward, beginning at the inner circumferential area 40 of the intermediate disc 4. At that, the slit 47 is not formed continuously up to the outer circumferential area 46 of the intermediate disc 4. A connection area 49 remains at the intermediate disc. Thus, the intermediate disc still has a material area that is located between the outer and the inner circumference, whereby a certain stability of the intermediate disc is ensured, and any widening of the intermediate disc is prevented.

The slit 47 has a width B and a slit length S, namely in such a manner that a ratio of the slit width B to the slit length S is approximately 0.12. The slit width B also approximately corresponds to the radial length of the connection area 49. Thus, the width B of the slit 47 is chosen to be equal to a width V of the connection area 49. In this exemplary embodiment, the slit 47 is arranged at an intermediate area between two recesses 41. Here, a maximum ring width R of the intermediate disc and the slit length S are chosen in such a manner that a ratio of the slit length to the ring width is approximately 0.9.

Figure 2:
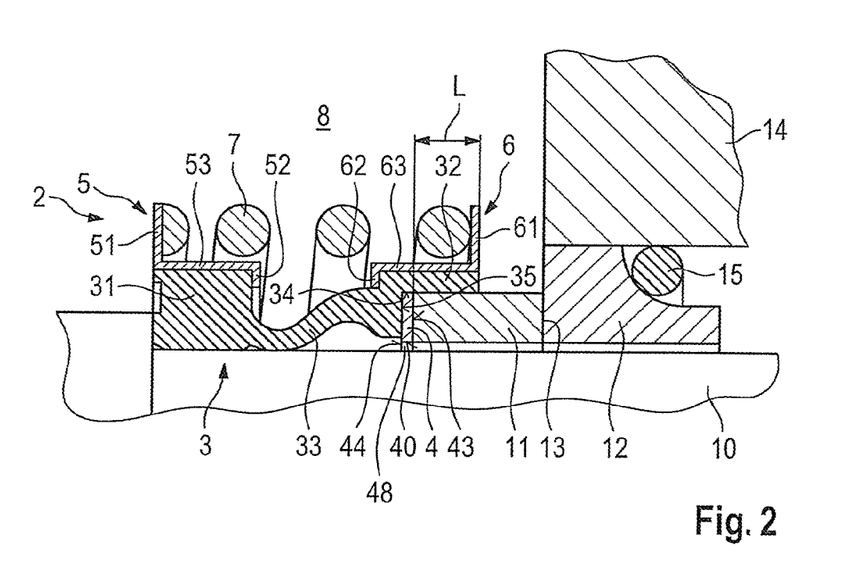
FIG. 2 shows an enlarged detailed view of FIG. 1.

As can be seen from FIG. 2, the ring-shaped intermediate disc 4 is arranged between the rotating slide ring 11 and the bellows element 3 in such a manner that the intermediate disc 4 abuts a first side 43 at a rear side of the rotating slide ring 11, and abuts a second side 44 at the face-side contact surface 35 of the bellows element 3. The intermediate disc 4 further has a constant width.

The bellows unit 2 further comprises a pre-tensioning element 7, which in this exemplary embodiment is a barrel spring. Here, the pre-tensioning element 7 is supported between the first Z profile angle 5 and the second Z profile angle 6, providing a permanent pre-tensioning of the bellows unit 2.

By providing the rigid intermediate disc 4 between the elastomer bellows element 3 and the rotating slide ring 11 according to the invention, an improved axial readjusting behavior of the mechanical seal arrangement 1 can now be facilitated according to the invention. In particular through the slit ring-shaped intermediate disc 4, an axial readjusting behavior of the bellows element can be ensured in all operational states. The intermediate disc 4 expands at high temperatures, so that the gap 48 between the inner circumferential area 40 of the intermediate disc 4 and the rotating structural component is sufficiently large. When cooling down, the intermediate disc contracts radially inward. However, in the course of this process, the slit 47 extending from the inner circumferential area 40 now also facilitates contraction of the inner circumferential area when it cools down, without the intermediate disc 4 shrinking onto the rotating structural component 10 as a result of that. In this manner, the axial adjusting capacity of the bellows element is maintained even at low temperatures.

According to the invention, the intermediate disc that is slit only partially thus provides a simple and cost-effective solution for temperature-related changes in the dimensions of the intermediate disc 4.

Further, in the event of the intermediate disc widening, the connection area 49 provided radially at the end of the slit 47 in the intermediate disc prevents any damage to the elastomer bellows element 3 by an edge at the outer circumferential area.

Thus, according to the invention, the problem of the intermediate disc 4 shrinking onto the rotating structural component 10 can be solved without any damage to the bellows element occurring as a result, and without causing any disadvantages with respect to the axial readjusting behavior of the bellows element 3.

In contrast, the intermediate disc 4, which may for example be made of a stable synthetic material, can move on the outer circumference of the rotating structural component 10 without any adhesion effects, and also remove any contaminations off the surface of the rotating structural component. Thus, the disadvantage that has so far been present in the state of the art in elastomer bellows elements with resect to their readjusting behavior after a certain operating time can be overcome by proficiently providing the intermediate disc 4. Further, a leakage at the sealing gap 13 can be significantly reduced according to the invention, since an axial readjusting of the mechanical seal is always possible, and the sealing gap width can be kept as small as possible.

Further, the intermediate disc 4 also has the advantage that a considerable shortening of the mechanical seal arrangement is possible in the axial direction X-X, because the support shoulder, which has so far been necessary for elastomer bellows elements in the state of the art and which has been provided in the area of the second connector area 32, supporting the bellows element 3 on the rotating structural component 10, can be foregone. As a result, axial installation space is saved. At the same time, the use of the intermediate disc 4 also creates the possibility of clamping the rotating slide ring 11 in the axial direction X-X over a longer axial area 63 of the second Z profile angle 6 across a longer axial direction (clamping length L), and of thus reducing a radial crimping of the rotating slide ring 11 (cf. FIG. 2). This results in positive effects on the rotating slide ring 11 in particular with respect to a possible undesired deformation of the sliding surface of the rotating slide ring 11. This deformation can lead to an additional undesired leakage at the mechanical seal during operation.

The bellows unit 2 according to the invention thus facilitates a number of surprising advantages when elastomer bellows elements 3 are used. Here, the bellows unit 2 can be built in an even more compact manner in the axial direction X-X. The option of shortening the seal installation length in the axial direction X-X thus results in an extremely great competitive edge. Further, the bellows unit 2 according to the invention can also easily dampen the vibrations that may occur during operation, performing even after a log operating time thanks to axial adjusting motions being possible at all times.

FIGS. 6 to 9 show a mechanical seal arrangement according to a second exemplary embodiment in which the intermediate disc 4 additionally comprises projecting ledges 45 in the axial direction X-X. These projecting ledges 45 are formed at the inner circumferential area 40 of the intermediate disc 4. Here, a recess 41 and an axially projecting ledge 45 are respectively alternatingly provided at the inner circumferential area 40 (cf. FIG. 8). At that, a number of recesses 41 and a number of the axially projecting ledges 45 is uneven. In this exemplary embodiment, respectively nine recesses 41 and nine ledges 45 are provided. At that, the slit 47 is formed radially outward, beginning at a recess 41.

Figure 9:
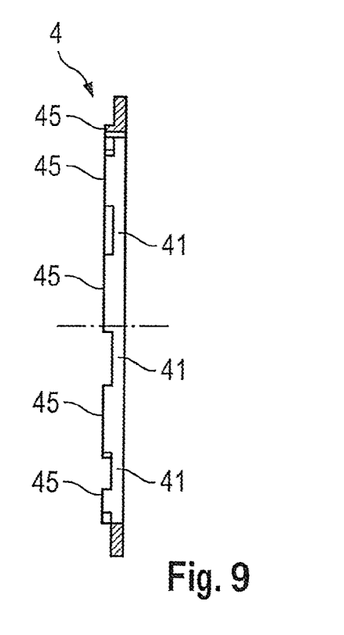
FIG. 9 shows a schematic sectional view of the intermediate disc of FIG. 7.

The recesses 41 are again provided to be bow-shaped. As can be seen in FIG. 9, the intermediate disc 4 thus has an L-shape in section when the section is made through the axially projecting ledge 45.

At that, the axially projecting ledges 45 facilitate a stable support of the bellows element 3. In this manner, it is further ensured that the bellows element 3 cannot come into contact with the rotating structural component 10 in the area of the second connector area 32 and compromise an axial readjusting behavior of the bellows element 3, for example. The ledges 45 thus provide a support of the elastomer bellows element 3 without compromising the ability of the intermediate disc 4 according to the invention to contract at the inner circumferential area 40 when cooling off.

PARTS LIST 1 mechanical seal arrangement
2 bellows unit
3 bellows element
4 intermediate disc
5 first Z profile angle
6 second Z profile angle
7 pre-tensioning element
8 first space
9 second space
10 rotating structural component/shaft
11 rotating slide ring
12 stationary slide ring
13 sealing gap
14 housing
15 secondary sealing element/O-ring
31 first connector area
32 second connector area
33 bellows intermediate area
34 ledge
35 face-side contact surface of the bellows element
40 inner circumferential area
41 recess
42 projecting areas
43 first side
44 second side
45 ledge
46 outer circumferential area
47 slit
48 ring-shaped gap
49 connection area
51 first radially outward facing area
52 first radially inward facing area
53 first axial area
61 second radially outward facing area
62 second radially inward facing area
63 second axial area
B width of the slit
L axial clamping length
S length of the slit
R maximum ring width of the intermediate disc
V radial width of the connection area
X-X axial direction

The invention claimed is:

1. Mechanical seal arrangement, comprising a rotating slide ring and a stationary slide ring which define a sealing gap in between them, and a bellows unit with a bellows element and an intermediate disc, wherein the bellows element has a first connector area, a second connector area, and a bellows intermediate area, wherein the bellows element is made of an elastomer material and provides a connection between the rotating slide ring and a rotating structural component, wherein the intermediate disc is arranged between the bellows element and the rotating slide ring, and wherein the intermediate disc has at least one slit that has a slit width (B) that is smaller than a slit length, and wherein the slit is closed on one side, so that a connection area remains at the slit at the intermediate disc, and wherein a plurality of recesses is provided at an inner circumferential area of the intermediate disc, wherein each of the recesses includes a width and a depth, wherein the width of each of recesses is greater than the width of the slit, and wherein the length of each of the recesses is less than the slit length.

2. Mechanical seal arrangement according to claim 1, wherein the slit begins at the inner circumferential area of the intermediate disc.

3. Mechanical seal arrangement according to claim 1, wherein exactly one slit is provided at the intermediate disc.

4. Mechanical seal arrangement according to claim 1, wherein a slit width (B) corresponds to a radial length of the connection area.

5. Mechanical seal arrangement according to claim 1, wherein a ratio of the slit width (B) to the slit length (S) is in a range of 0.05 to 0.35.

6. Mechanical seal arrangement according to claim 5, wherein the ratio of the slit width (B) to the slit length (S) is approximately 0.17.

7. Mechanical seal arrangement according to claim 1, wherein a ratio of the slit length (S) to a ring width (R) of the intermediate disc is in a range of 0.7 to 0.95.

8. Mechanical seal arrangement according to claim 7, wherein the ratio of the slit length (S) to the ring width (R) of the intermediate disc is 0.85.

9. Mechanical seal arrangement according to claim 1, wherein the recesses are arranged at regular distances at the inner circumferential area of the intermediate disc, and/or that the intermediate disc has an uneven number of recesses.

10. Mechanical seal arrangement according to claim 1, wherein the slit extends from the inner circumferential area beginning at one of the recesses.

11. Mechanical seal arrangement according to claim 1, wherein the intermediate disc has a plurality of axially projecting ledges which are formed alternatingly with the recesses at the inner circumferential area of the intermediate disc.

12. Mechanical seal arrangement according to claim 1, wherein the bellows unit further comprises a first Z profile angle and a second Z profile angle, wherein the first Z profile angle is arranged at an outer side of the first connector area, and wherein the second Z profile angle is arranged at an outer side of the second connector area.

13. Mechanical seal arrangement according to claim 12, wherein the second Z profile angle ends at the same height in the axial direction (X-X) as the second connector area.

14. Mechanical seal arrangement according to claim 12, wherein a first radially inward facing area of the first Z profile angle overlaps with an end of the first connector area that faces towards the bellows intermediate area, and/or that a second radially inward facing area of the second Z profile angle overlaps with an end of the second connector areas that faces the bellows intermediate area.

15. Mechanical seal arrangement according to claim 12, further comprising a pre-tensioning element which pre-tensions the bellows unit in the axial direction (X-X), wherein the pre-tensioning element is supported at a first end area at the first Z profile angle, and is supported with a second end area at the second Z profile angle.

16. Mechanical seal arrangement according to claim 1, wherein the intermediate disc includes a first side having a single elevation, and a second side having a single elevation.

17. Mechanical seal arrangement according to claim 1, wherein the intermediate disc includes a single outer circumference.

18. Mechanical seal arrangement, comprising a rotating slide ring and a stationary slide ring which define a sealing gap in between them, and a bellows unit with a bellows element and an intermediate disc, wherein the bellows element has a first connector area, a second connector area, and a bellows intermediate area, wherein the bellows element is made of an elastomer material and provides a connection between the rotating slide ring and a rotating structural component, wherein the intermediate disc is arranged between the bellows element and the rotating slide ring, and wherein the intermediate disc has at least one slit that has a slit width (B) that is smaller than a slit length, and wherein the slit is closed on one side, so that a connection area remains at the slit at the intermediate disc, and wherein a plurality of recesses is provided at an inner circumferential area of the intermediate disc, wherein the intermediate disc includes a single outer circumference.

\* \* \* \* \*